Inventors
Alfred F. Curtis
and Paul C. Rorick
By Frease & Bishop Attorneys

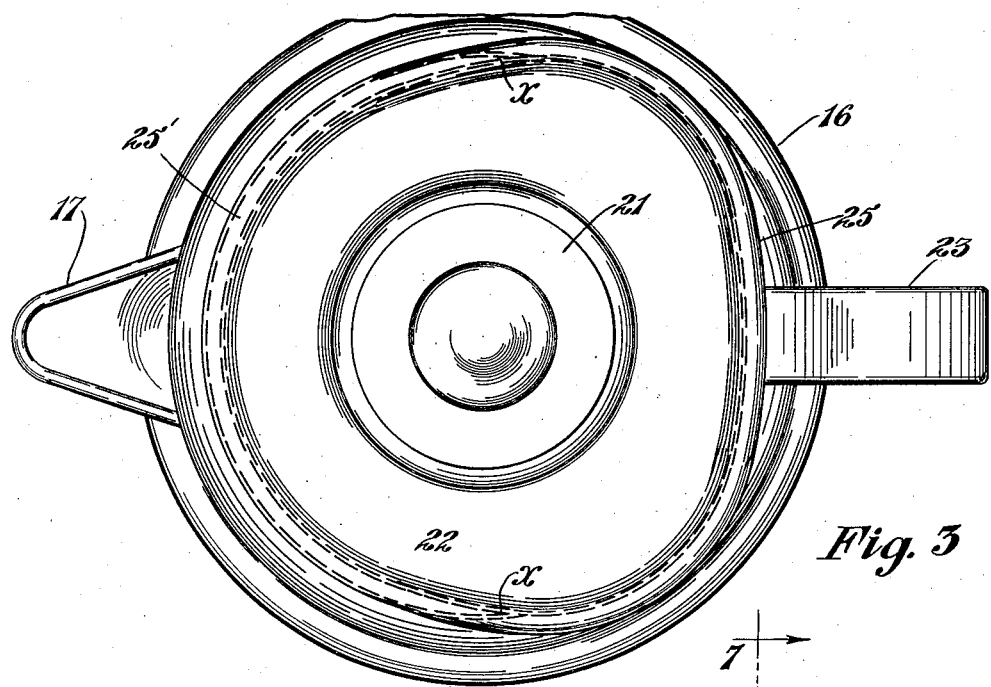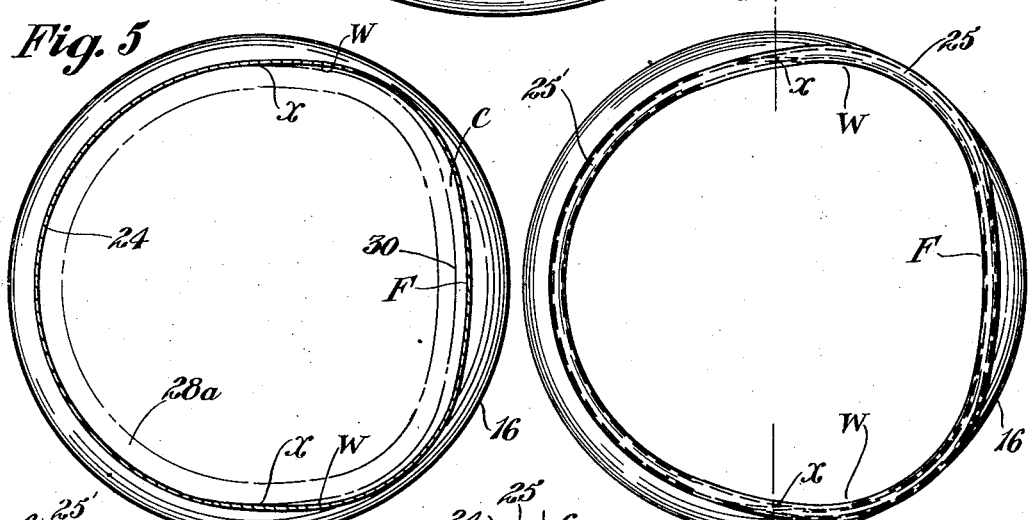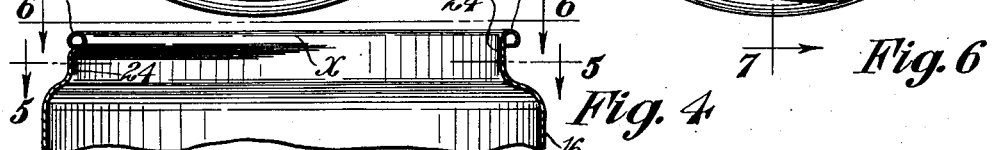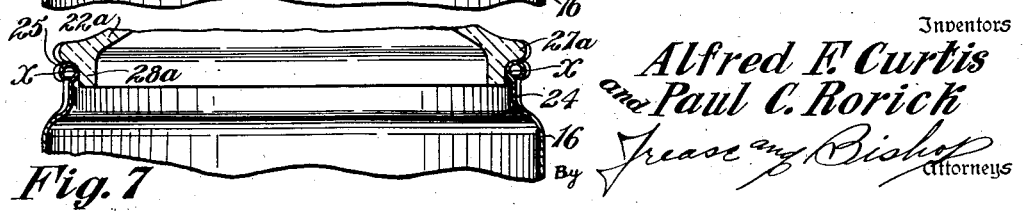

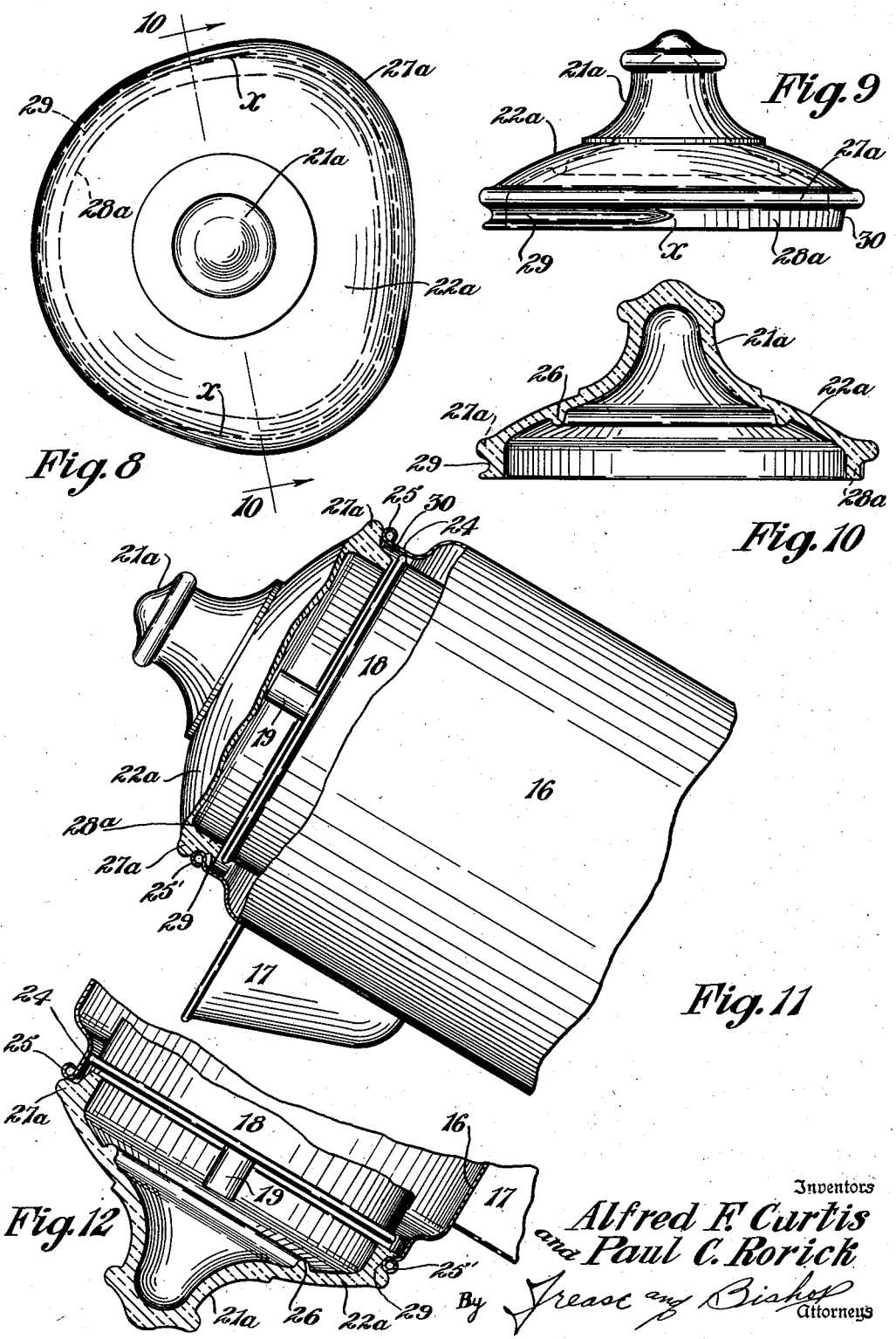

INVENTORS
Alfred F. Curtis
and Paul C. Rorich
BY Frease and Bishop
ATTorneys

Patented May 18, 1948

2,441,688

UNITED STATES PATENT OFFICE 2,441,688

COVER CONSTRUCTION FOR KITCHEN UTENSILS

Alfred F. Curtis, North Canton, and Paul C. Rorick, Canton, Ohio, assignors to The Republic Stamping & Enameling Company, Canton, Ohio, a corporation of Ohio Application July 21, 1945, Serial No. 606,438

9 Claims. (Cl. 220—59)

The invention relates generally to kitchen utensils for containing liquids, such as pots, pans, and cooking vessels, and more particularly to an improved cover construction therefor, by which the cover is held in place when the contents of the vessel are poured.

Numerous prior cover constructions for vessels have been proposed to retain the cover in place while pouring, but all of these prior constructions have certain disadvantages. For example, common teapot cover construction includes the provision of diametrically opposite inwardly projecting ears on the mouth of the pot, which overlap the edge of the cover. In order that the cover may be easily inserted under these ears, its depending flange must be much smaller than the pot mouth with the result that the cover has a loose or sloppy fit and rattles easily.

A variation of this construction is to provide notches in the edge of the cover to register with the ears, so that the cover may be put on easily, but it must be turned or twisted to engage under the ears. It is a common occurrence with this construction for the housewife to forget to turn the cover after it is in place, with the result that the cover falls off when pouring, often causing serious mishaps not only to the cover but to chinaware and the like on which it falls.

Another prior construction includes the provision of a wide overhanging flange on the pouring side of the circular mouth of a vessel and a corresponding rib or projection on the cover fitting under said flange. With this construction, in order that the cover may be put in place on or removed from the mouth of the vessel, not only must it have a loose fit with the mouth, but the lip can only extend over about one-third of the circumference of the cover. Thus, when the vessel is tilted to approach an upside down position for draining its contents, the cover will fall off because only about one-third of its lower circumference is held by the flange.

It is to be noted that the provision of inwardly projecting ears or an overhanging flange on the mouth of a vessel adds materially to its manufacturing cost, particularly in the case of sheet metal or enameled kitchen ware.

Other prior constructions, which are variations of those previously described, include the provision of projections extending outwardly from the underside of the cover for engaging under the mouth of the vessel. These constructions are subject to the requirement that the cover must have a loose fit in order to be inserted or removed, and moreover, such projections are frequently bent or broken in handling so as to preclude proper functioning thereof.

All of these prior constructions have been so unsatisfactory that it is common practice to provide a hinged cover on certain kitchen vessels such as coffee percolators, which increases the manufacturing cost and also makes it more difficult to wash the pot and cover.

It is an object of the present invention to provide a novel cover construction for a kitchen vessel, in which the cover is easily inserted into and removed from the vessel mouth and will not fall out when the vessel is tilted for pouring.

Another object is to provide a novel self-locking cover construction in which the vessel may be tilted to substantially upside down position without the cover falling off.

Another object is to provide a novel self-locking cover construction in which the cover has a substantially tight fit with the vessel mouth at all times.

A further object is to provide a novel cover construction in which the cover is easily inserted into the locking position in the vessel mouth, without requiring turning of the cover to lock or unlock the same.

Another object is to provide a novel cover construction which is easily adapted for use in connection with a standard sheet metal vessel, without requiring the addition of ears or other projections thereto.

A still further object is to provide a novel cover construction in which the cover can be applied to the vessel in one position only, is self-locking in that position and is easily and quickly removed from that position.

Also, it is an object of the present invention to eliminate hinges in providing a cover which may be secured to a kitchen utensil.

Moreover, it is an object of the present invention to provide a new shape and contour for the mouth and cover of a vessel forming a self-locking cover construction.

Finally, it is an object of the present invention to provide a novel cover construction for kitchen vessels which overcomes the disadvantages of prior constructions, which attains all of the foregoing desiderata, and which is simple and inexpensive to manufacture.

These and other objects and advantages apparent to those skilled in the art from the following description and claims may be obtained, the stated results achieved, and the described difficulties overcome, by the devices, constructions, arrangements, combinations, sub-combinations, parts, and elements which comprise the present invention, the nature of which is set forth in the following general statement, preferred embodiments of which—illustrative of the best modes in which applicants have contemplated applying the principle—are set forth in the following description and shown in the drawings, and which are particularly and distinctly pointed out and set forth in the appended claims forming part hereof.

The nature of the improvements of the present invention may be stated in general terms as including in a vessel having a mouth, an inner bead extending around substantially one-half only of the periphery of said mouth on the pouring side of the vessel, the other half of said periphery being distorted to produce a mouth of substantially oval shape, a matching cover having a depending flange shaped for closely and telescopically fitting in said mouth and a groove on the flange for engaging under said bead throughout its length, there being sufficient clearance between the flange and mouth throughout the distorted half of its periphery as by tapering the flange to allow removal of the cover by a combined lateral and upward tilting movement thereof.

By way of example, preferred embodiments of the improved cover construction are illustrated in the accompanying drawings forming part hereof, wherein:

Fig. 3 is a top plan view of the coffee percolator shown in Fig. 1;

Fig. 4 is a fragmentary sectional view similar to Fig. 1, on a reduced scale, with the cover and ground coffee basket removed;

Fig. 5 is a plan sectional view taken substantially on line 5—5, Fig. 4;

Fig. 6 is a plan elevational view as on line 6—6, Fig. 4;

Fig. 7 is a fragmentary sectional view as on line 7—7, Fig. 6, showing an all-glass cover in position in the mouth of the vessel;

Fig. 8 is a plan elevational view on a reduced scale of the all-glass cover shown in Fig. 2;

Fig. 9 is a side elevation thereof;

Fig. 10 is a sectional view thereof as on line 10—10, Fig. 8;

Fig. 11 is a fragmentary elevational view, with parts in section, of the coffee percolator of Fig. 2 on a reduced scale, in tilting position at the beginning of a pouring operation;

Fig. 12 is a fragmentary sectional view similar to Fig. 11 with the percolator tilted substantially upside down position;

Fig. 15 is a fragmentary sectional view showing the invention applied to a sheet metal vessel and cover, such as a tea kettle and the like.

Similar numerals refer to similar parts throughout the drawings.

Figure 1:
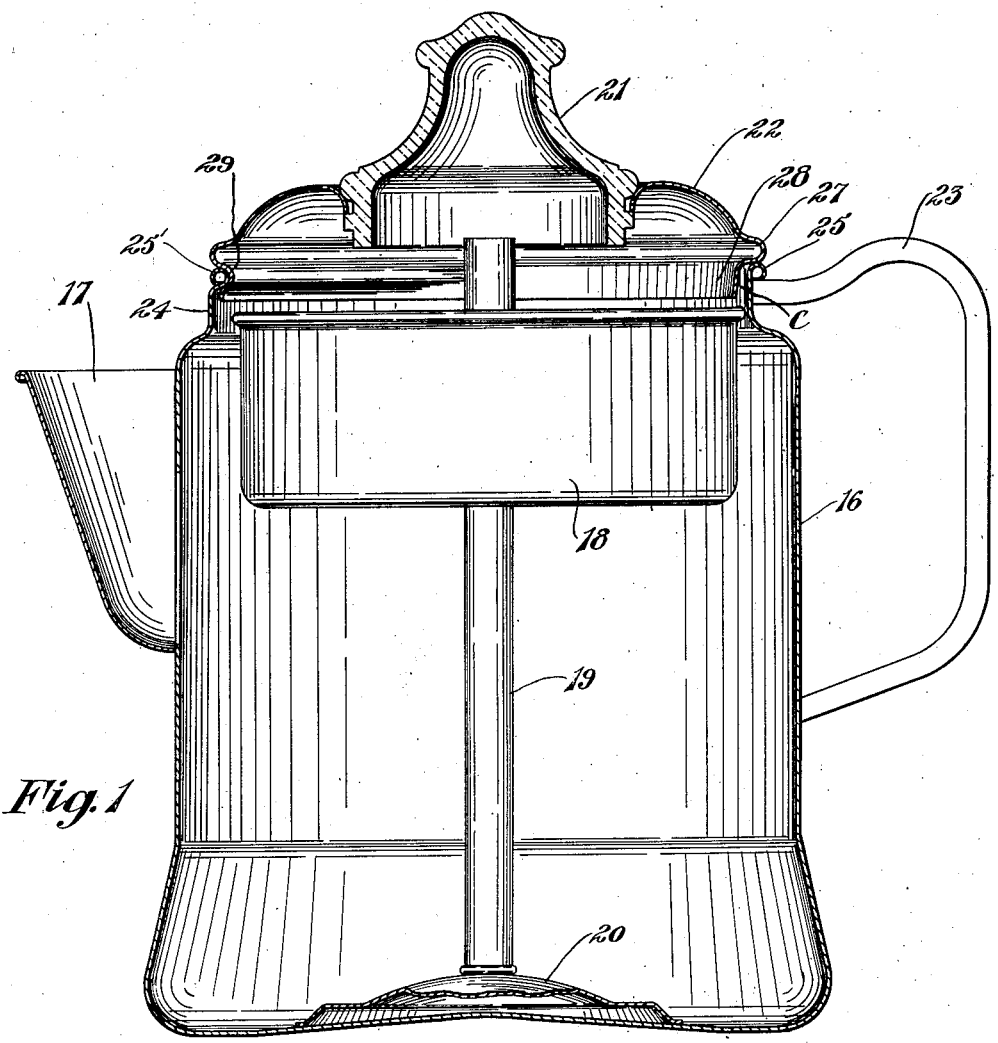
Figure 1 is a vertical sectional view of a sheet metal coffee percolator embodying the invention, the cover being of the glass insert type.

Referring to Figure 1, a coffee percolator is shown therein including a sheet metal container or vessel of circular cross section indicated at 16, having a pouring spout 17 at one side thereof. The usual basket 18 for containing ground coffee is shown supported on the tube 19 having a base 20, and the upper end of the tube 19 is positioned under a glass dome insert 21, for discharging liquid coffee upwardly into the same. The glass dome insert 21 is shown mounted in a sheet metal cover 22, and may be held in place in said cover by means of an ordinary bayonet locking device, not shown. The coffee percolator is provided on the side opposite the pouring spout 17 with a suitable handle 23.

The general construction of the parts as thus far described is well known and in accordance with common practice, and forms no part of the present invention. The construction of the lower part of the cover 22 and of the mouth of the vessel 16 into which it fits, embodies the improvements of the present invention.

Figure 2:
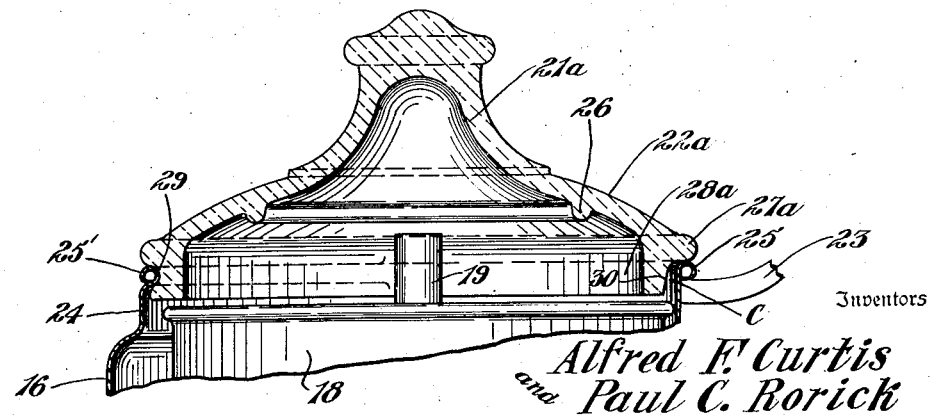
Fig. 2 is a fragmentary view similar to Figure 1 showing an all-glass cover.

Referring particularly to Figs. 1, 2 and 4, the upper end of the container or vessel 16 is shown reduced in diameter or necked in at 24 to provide a mouth of smaller circumference. The upper edge of the mouth 24 is provided with a flange such as the usual rolled bead 25, which is turned or rolled outwardly from the mouth 24 throughout the one-half of the mouth periphery on the handle side of the mouth. On the spout side or pouring side of the mouth, the bead 25' projects radially inward of the mouth 24 throughout the other one-half of its periphery.

Thus, as clearly shown in Figs. 3 and 6, the bead 25 is on the outside of the mouth 24 throughout one-half its length or between the midpoints $x$, and the bead 25' is inside of the mouth 24 throughout the other one-half of its periphery between the points $x$. Thus, the bead 25' terminates, or changes from an inner bead to an outer bead, at the points $x$.

In forming the bead 25, 25' it may be first formed on the outside of the mouth 24 throughout its entire periphery, and then rolled or pressed inwardly throughout one-half of its periphery on the pouring side of the mouth to form the bead 25'.

As shown in Figs. 5 and 6, the shape or contour of the mouth 24 on the pouring side preferably is semi-circular, while the shape or contour of the mouth on the handle side is distorted in such manner that the entire periphery of the mouth is out-of-round or substantially oval or somewhat egg-shaped.

The distortion of the mouth 24 is such that adjacent to the points $x$ on the handle side the mouth is slightly widened, as shown at W, in a direction at right angles to the center line of the pouring spout 17, and the edge of the mouth on the handle side becomes somewhat flattened as shown at F. As shown in Fig. 6, the amount of the distortion of the mouth is such that the outer edge of the bead 25 at its widest parts overlies but does not overhang the circular periphery of the vessel 16 and the mouth opening has unequal widths in transverse directions.

As shown, in Figure 1, the cover 22 is of sheet metal with a glass dome insert, and as shown in Fig. 2, the cover 22a is of all-glass construction. The under surface of the all-glass cover 22a is preferably provided with a circular drip ring or rib 26 for the purpose of collecting liquid flowing downwardly along the dome 21a, and directing it downwardly.

The cover 22 has an outer rim 27 which seats on the bead 25 and a depending flange 28 fitting within the mouth 24 of the vessel 16; and the cover 22a has a similar rim 27a and a depending flange 28a. The construction of the outer surfaces of the flanges 28 and 28a are substantially the same, for cooperation with the bead 25, 25' to accomplish the stated purposes and achieve the results of the present invention.

Thus, the depending flange 28 or 28a is substantially oval in shape for fitting closely within the mouth 24, and the portion of the flange which fits into the pouring side of the mouth 24 is provided with a groove 29, substantially semi-circular in cross section, which extends entirely around one-half of the flange and engages the bead 25'. In other words, the groove 29 extends between the midpoints $x$ around the pouring side of the percolator, when the cover is in position thereon, and engages the bead 25' throughout its entire length, or substantially throughout one-half of the periphery of the cover.

As shown in Figs. 1 and 2, when the cover is in position with the groove 29 tightly engaged around and under the bead 25', there is a substantial clearance between the mouth 24 and the depending flange 28 or 28a at the side opposite the pouring spout 17, as indicated at C. Referring to Fig. 5, in which the depending flange 28a is shown in dot-dash lines, this clearance is shown extending around the handle side of the mouth 24 and becomes gradually less as it approaches the points $x$ until the outer surface of the depending flange begins to engage the bead 25' at the points $x$, as indicated in Fig. 7, and continues to engage the bead 25' throughout its length.

Figure 13:
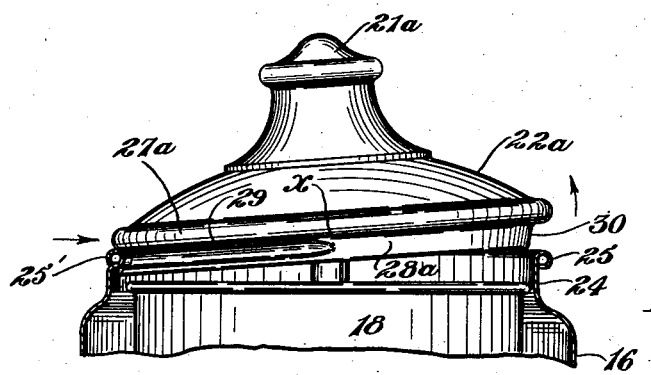
Fig. 13 is a fragmentary sectional view similar to Figs. 11 and 12 with the all-glass cover shown in elevation, showing the position of the cover at the beginning of the operation of removing the same.
Figure 14:
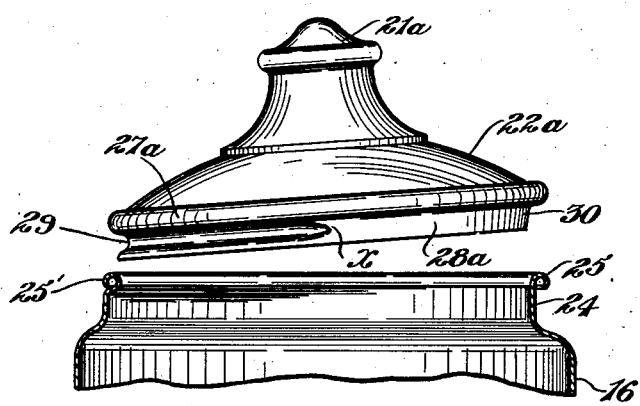
Fig. 14 is a similar view showing the cover in a position just removed from the mouth of the vessel.

Thus, when it is desired to remove the cover 22 or 22a, as viewed in Figs. 5, 13 and 14, the cover is moved slightly laterally to the right as permitted by the clearance C, whereupon it may be tilted slightly upwardly at the handle side as indicated at Fig. 13, the flange 28 or 28a being beveled or tapered slightly inward at 30 to clear the mouth. Then by a combined further lateral and upward tilting movement, it may be removed as indicated in Figs. 13 and 14.

In using a coffee percolator having the novel cover construction, after the vessel 16 has been filled with the desired amount of water and the ground coffee placed in the basket 18, the cover 22 or 22a is applied by engaging the groove 29 with the bead 25', as shown in Fig. 13, and then moving the opposite side of the cover downwardly and to the left into the position of Fig. 2.

Due to the bevel 30 on the flange 28 or 28a and the clearance C between the flattened portion of the flange and the mouth on its handle side, the cover slips into place very easily, provided the cover is properly oriented to register with the mouth. Because of the oval shape of the mouth 24 and of the depending flange 28 or 28a, the cover can be applied in only one axial position, which insures that it is in self-locking position when applied.

When the percolator with the cover in place is tilted as indicated in Fig. 11 to pour its contents from the spout 17, the weight of the cover maintains the groove 29 tightly engaged with the inner bead 25' throughout its entire length, which in this position is the lower one-half of the periphery of the cover.

As the percolator is tilted further to approach a substantially upside down position, as shown in Fig. 12, the engagement of the groove 29 with the bead 25', throughout the lower one-half of the periphery of the cover, continues to prevent the cover from falling out until a substantially upside down position is reached where the cover by gravity moves the groove 29 slightly laterally away from the bead 25' on the pouring side. When this occurs, the engagement of the flange 28a at the locations $x$ is released and the cover drops. However, it is never necessary to tilt the percolator to such an extent, even though the entire contents are drained.

If the engagement of the groove 29 with the bead 25' stopped short of the midpoints $x$, that is, was less than throughout one-half of the periphery of the cover, the cover would be released and fall shortly after the percolator was tilted past a horizontal position.

Figure 15:
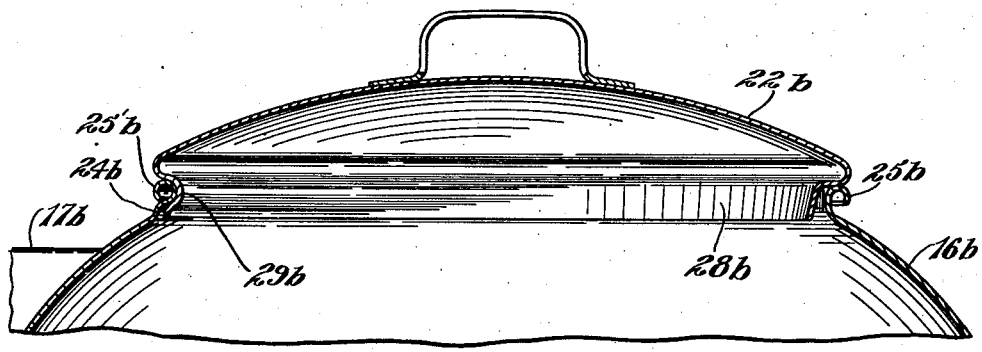

In Fig. 15, the novel cover construction is shown applied to a teakettle or the like having a sheet metal vessel or container 16b with a pouring spout 17b. The mouth 24b of the vessel 16b is of the same oval shape as the mouth 24 of vessel 16, and has an inner bead 25'b extending around one-half of its periphery on the pouring side. The outer bead 25b extends around the other one-half of the mouth.

The cover 22b is preferably of sheet metal and has a depending flange 28b fitting within the mouth 24b. The flange 28b is provided with a groove 29b engaging under the inner bead 25'b throughout its entire peripheral length.

Thus, the novel cover construction has a close fit to substantially eliminate rattling; has no hinges, ears or similar projections to mar its appearance and increase its manufacturing cost; is easily applied in self-locking position without subsequent turning; and is just as easily removed.

A vessel having the improved cover construction is inexpensive to manufacture, attractive in appearance, is easily produced in a standard sheet metal vessel, and provides a cover which is self-locking while pouring and draining the contents of the vessel.

In the foregoing description, certain terms have been used for brevity, clearness and understanding; but no unnecessary limitations are to be implied therefrom beyond the requirements of the prior art, because such words are utilized for descriptive purposes herein and not for the purpose of limitation and are intended to be broadly construed.

Moreover, the embodiments of the improved construction illustrated and described are by way of example, and the scope of the present invention is not limited to the exact detail of construction of the various parts.

Having now described the features of the invention, the construction, assembly and use of a preferred embodiment of the improved cover for a kitchen utensil, and the advantageous, new and useful results attained thereby; the new and useful devices, constructions, arrangements, combinations, sub-combinations, parts and elements, and reasonable mechanical equivalents thereof obvious to those skilled in the art, are set forth in the appended claims.

We claim:

1. In a vessel adapted for pouring from one side and having an open mouth, said mouth being substantially semi-circular on the pouring side of the vessel and widened on the opposite side of the vessel, an inner bead on the semi-circular portion of said mouth extending around substantially one-half its periphery, a cover having a depending flange shaped for closely fitting in said mouth, said flange having a groove in its outer surface for engaging under said bead throughout its length, and there being sufficient clearance between said flange and the remaining one-half of the periphery of said mouth to permit removal of the cover by a combined lateral and upward tilting movement thereof.

2. In a vessel adapted for pouring from one side and having an open mouth, an inner bead extending around substantially one-half the periphery of said mouth on the pouring side of the vessel, the other half of said periphery being widened transversely of the pouring side, a cover having a depending flange for closely fitting within said mouth, said flange having a groove in its outer surface for engaging under said bead throughout its peripheral length, and said flange being spaced inwardly from said other half of said mouth a distance sufficient to permit removal of the cover by a combined lateral and upward tilting movement thereof.

3. In combination, a vessel adapted for pouring from one side and having an open mouth, a cover for said mouth, said mouth having an inner bead extending around one-half of its periphery on the pouring side of the vessel and being widened and flattened throughout the other one-half of its periphery, said cover having a depending flange for fitting within said mouth, said flange having a groove in its outer surface for engaging under said bead and holding the cover in place while the vessel is tilted for pouring, and said flange being spaced inwardly from the widened and flattened portion of said mouth to permit movement of said cover in a direction away from said bead a distance sufficient to permit removing the cover by tilting its opposite side upwardly.

4. In a vessel adapted for pouring from one side and having an open mouth, an inner bead extending around substantially one-half the periphery of said mouth on the pouring side of the vessel, the other half of said periphery being widened transversely of the pouring side and flattened on its opposite side, a cover having a depending flange for closely fitting within said mouth, said flange having a groove in its outer surface for engaging under said inner bead throughout its entire peripheral length, and said flange being spaced and beveled away from said flattened mouth portion to permit removal of the cover by a combined lateral and upward tilting movement thereof.

5. In combination, a vessel adapted for pouring from one side and having an open mouth, a cover for said mouth, said mouth having a bead around its upper edge, the bead projecting inwardly of the mouth throughout substantially one-half of its periphery on the pouring side of the vessel and projecting outwardly of the mouth throughout the other one-half of its periphery, said other one-half of said periphery being widened adjacent to the ends of said inner bead, said cover having a depending flange for closely fitting within said mouth, said flange having a groove in its outer surface for engaging under said inner bead throughout its length, and said flange being spaced inwardly from the mouth on the side opposite to its pouring side sufficiently to permit removal of the cover by moving the same laterally and upwardly away from the pouring side of the mouth.

6. In kitchen utensil construction, a sheet metal vessel having side walls terminating in a mouth formed with a continuous rolled bead, said mouth having an out-of-round contour having unequal widths in transverse directions, said bead inwardly overhanging the mouth wall at one portion of the mouth opening and outwardly overhanging the mouth wall at an opposite portion of the mouth opening and merging from an inward overhanging bead to an outward overhanging bead between said opposite portions, a cover for said vessel having a contour matching the mouth wall contour formed with an outturned flange adapted to rest on said bead and with a depending flange received within the mouth, said depending flange being formed with a groove engageable with said inwardly overhanging bead portion of the mouth and being beveled adjacent the outwardly overhanging bead portion of the mouth.

7. In kitchen utensil construction, a vessel having side walls terminating in a mouth formed with an out-of-round contour having a rounded pouring portion and a flattened opposite portion, the mouth wall being formed with an inwardly overhanging flange along said rounded pouring portion, a cover for said vessel having an out-of-round contour matching the contour of the mouth and having a depending flange adapted to be telescoped within the mouth, said depending flange being formed with a groove engageable with said vessel flange and being beveled adjacent the flattened portion of the mouth.

8. In kitchen utensil construction, a vessel having side walls terminating in a mouth having an out-of-round contour of unequal widths in transverse directions, inturned flange means at the top of the mouth wall along a portion of the mouth opening terminating adjacent the greatest width thereof, and a cover for said vessel having a contour matching the contour of the mouth formed with a depending flange telescopically received within the mouth, and said depending flange being formed with a groove engageable with said vessel flange means.

9. In kitchen utensil construction, a vessel having side walls terminating in a mouth having an out-of-round contour with a rounded pouring portion and an opposite flattened portion, a cover for said vessel having a depending flange of contour matching the mouth wall contour adapted to be received within the mouth, and interengageable formations on the mouth rounded pouring portion of the mouth wall and cover flange locking the cover to the vessel when the vessel is tilted for pouring therefrom.

ALFRED F. CURTIS.
PAUL C. RORICK.

REFERENCES CITED

The following references are of record in the file of this patent:

UNITED STATES PATENTS

| Number | Name | Date |
|---|---|---|
| 1,408,410 | Sidle | Feb. 28, 1922 |
| 2,214,623 | Millen | Sept. 10, 1940 |

FOREIGN PATENTS

| Number | Country | Date |
|---|---|---|
| 6,743 | Great Britain | Mar. 19, 1898 |
| 114,107 | Great Britain | Mar. 21, 1918 |